(12) United States Patent
Hong et al.

(10) Patent No.: US 6,335,718 B1
(45) Date of Patent: *Jan. 1, 2002

(54) DATA TRANSMISSION APPARATUS AND METHOD

(75) Inventors: Jin Cheol Hong; Hong Sung Song, both of Kyungsangbuk-do (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,533

(22) Filed: Apr. 26, 1999

(30) Foreign Application Priority Data

Dec. 31, 1998 (KR) .............................. 98-63372

(51) Int. Cl.⁷ .................................. G09G 3/36
(52) U.S. Cl. ........................ 345/98; 345/87; 345/100; 345/153; 345/155; 345/202; 345/154
(58) Field of Search .............................. 345/98, 202, 2, 345/87, 100, 153, 155, 154

(56) References Cited

U.S. PATENT DOCUMENTS 5,748,902 A   5/1998   Dalton et al. .......... 395/200.76
5,917,364 A   6/1999   Nakanura .................... 327/415

FOREIGN PATENT DOCUMENTS

| EP | 0069183 | 1/1983 |
|---|---|---|
| EP | 0228528 | 7/1987 |
| JP | 9-233146 | 9/1997 |
| JP | 10-190751 | 7/1998 |
| WO | 92/09162 | 5/1992 |
| WO | 97/13347 | 4/1997 |
| WO | 97/13348 | 4/1997 |

OTHER PUBLICATIONS

Brochure from Crystal, A Cirrus Logic Company, Flat Panel Electronics—EMI Reduction Features DTR Block Diagram.

*Primary Examiner*—Richard Hjerpe
*Assistant Examiner*—Ali A. Zamani
(74) *Attorney, Agent, or Firm*—Long Aldridge & Norman, LLP (57) ABSTRACT

A data transmission apparatus a data transmitter selectively inverting data and transmitting the selectively inverted data. A data receiver selectively re-inverts the selectively inverted data from the data transmitter and reconstructs the inverted data into the original data. The inversion operation of the data transmitter and the data receiver is controlled by a mode controller. The mode controller receives data having a number of bits along with a clock signal to detect a number of transitions every period of the clock signal, and controls driving modes of the data transmitter and the data receiver in accordance with the detected number of transitions.

41 Claims, 9 Drawing Sheets

DATA TRANSMISSION APPARATUS AND METHOD

BACKGROUND OF THE INVENTION

This application claims the benefit of Korean Patent Application No. P98-63 372, filed on Dec. 31, 1998, which is hereby incorporated by reference.

1. Field of the Invention

This invention relates to a data transmission apparatus and method for transmitting parallel data and, more particularly, to a liquid crystal display device employing the data transmission apparatus. Although the present invention is applicable to a wide range of devices, it is especially applicable to a computer system employing the data transmission apparatus.

2. Discussion of the Related Art

Generally, the amount of information, such as text information and video information, transmitted over a transmission medium has been increasing as compared with that of audio information. Recently, the amount of video information, in particular, has been even more increasing so as to meet the demand for high quality images. In addition, information is being transmitted at a high speed so that a user can make use of it at an appropriate time. For these reasons, a frequency band to be occupied by the information must be heightened and, simultaneously, the number of lines for transmitting the information must be increased in accordance with the amount of information.

Figure 1:
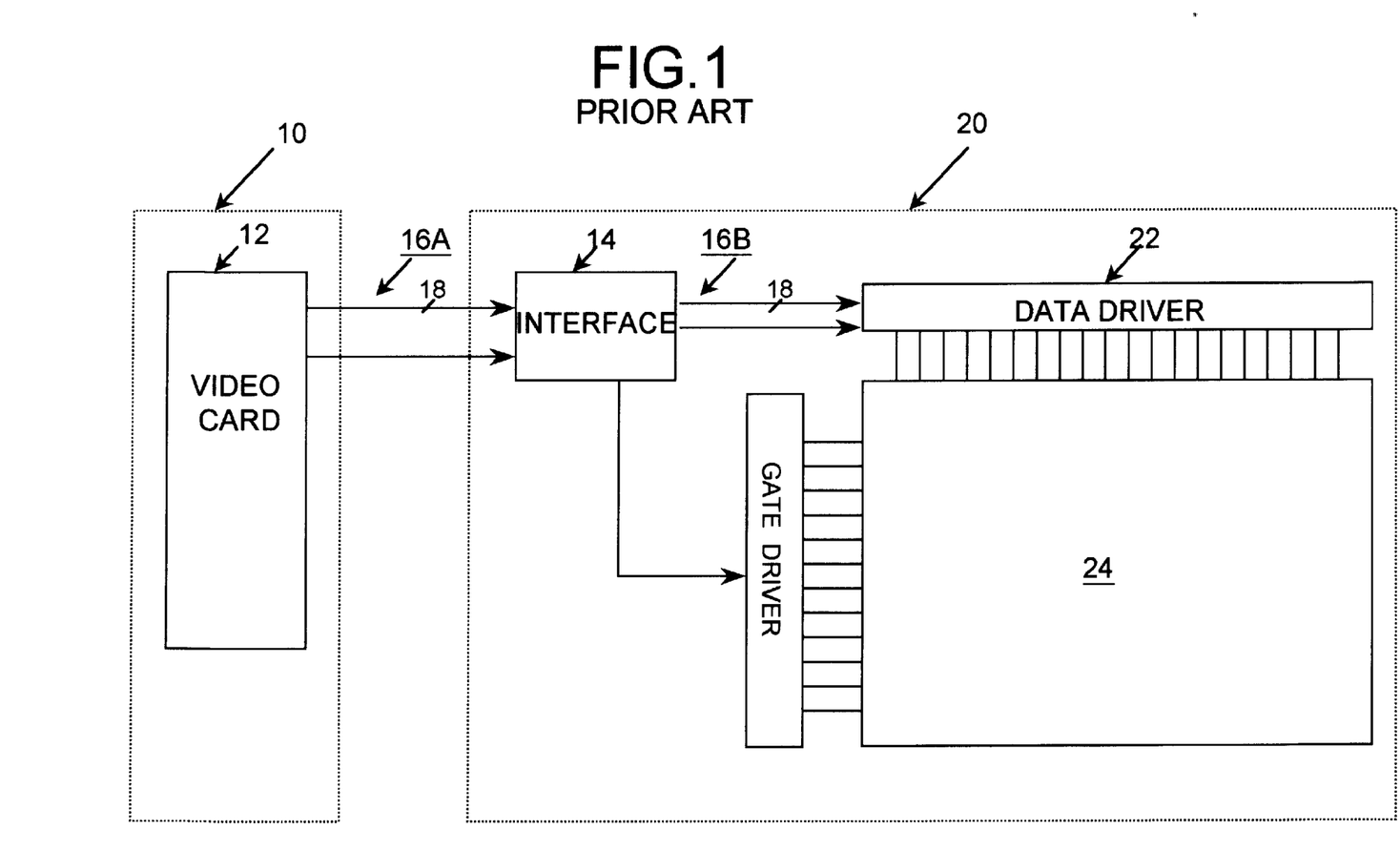
FIG. 1 is a block diagram showing the configuration of a conventional portable computer employing a liquid crystal display device.

For example, FIG. 1 shows a portable computer employing a liquid crystal display(LCD) where video data is transmitted from a video card 12 within a computer main body 10 to a data driving integrated circuit chip 22, hereinafter referred to as "D-IC", with increased frequency corresponding to a higher resolution mode of an image, i.e., the number of picture elements (or pixels) is larger. More specifically, since a greater number of pixels are included in a liquid crystal panel 24 as an XGA mode or SXGA mode replaces the existing VGA mode, the amount of video data for one line to be transmitted within one horizontal time interval becomes greater. Accordingly, the frequency of video data transmitted from the video card 12 within the computer main body 10 to the D-ICs 22 increases. In accordance with such a frequency increase, an electromagnetic interference (EMI) emerges on a first transmission line 16A and a second transmission line 16B. The first transmission line 16A is for continuously transmitting an 18 bit data for one dot from the video card 12 to an interface 14 in the LCD 20 and the second transmission line 16B is for continuously transmitting an 18 bit data from the interface 14 to the D-ICs 22. For example, the first transmission line 16A extending from the video card 12 to the interface 14 is usually made of a flexible printed circuit film, hereinafter referred to as "first FPC film". The exposed first FPC film generates a large amount of EMI. Also, when the D-ICs 22 are mounted on the FPC film in a TAB-IC type or loaded on the liquid crystal panel 24 in a chip-on-glass (COG) type, the second transmission line 16B connecting the interface 14 to the D-ICs 22 consists of a second FPC film. The exposed second FPC film also generates an EMI.

Output stages of the video card 12 and the interface 14 must be switched into a high-state voltage or a low-state voltage rapidly as the video data rate rises. Accordingly, the video card 12 transmitting data over the first transmission line 16A and the interface 14 transmitting a data over the second transmission line 16B require more power consumption in proportion to a rise in the frequency of the video data.

Further, the number of bits of the video data also increases as a gray scale of the picture is enlarged. For example, when each of a red data, a green data and a blue data, consisting of one dot of the liquid crystal display device, has 64 gray scales, the bit number of the video data becomes "18". In this case, each of the first-and second transmission lines 16A and 16B has 18 bit lines as shown in FIG. 1.

Figure 2:
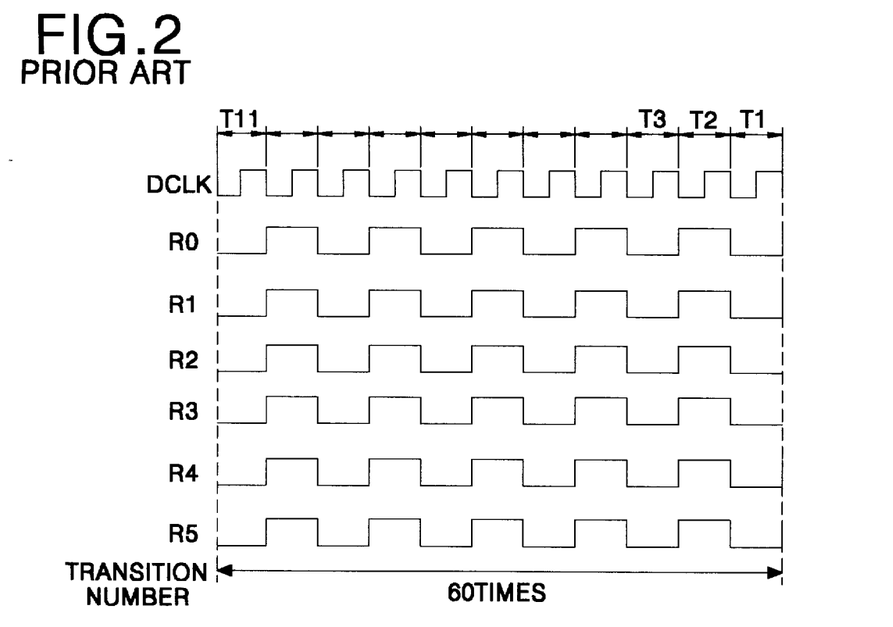
FIG. 2 is a timing diagram of video data transmitted from the conventional liquid crystal display device.

FIG. 2 shows a transmission timing of 6 bit red data, as an example, in a video data transmitted from the interface 14 to the D-IC 22 in the conventional liquid crystal display device. With reference to FIG. 2, the red data repeats a conversion from 0 gray scale into 63rd gray scale during T1 to T11 periods of dot clock timing. It is to be noted that a data transition from a high-state "1" into a low-state "0" in each bit line is made 60 times during 11 periods of dot clock timing. Such a data transition causes an increase in power consumption at each output stage.

On the other hand, if each of red, green and blue data has 256 gray scales by employing a 8 bit D-IC in the liquid crystal display device, then 24 bit lines of video data are required. As the bit number of video data increases, the number of bit lines included in each of the first and second transmission lines 16A and 16B also increases. Due to this, an EMI emerging at the first and second transmission lines 16A and 16B becomes more serious in proportion to the number of bits of the video data. Also, power consumption at the video card 12 and the interface 14 is increased even more.

SUMMARY OF THE INVENTION

Accordingly, the present invention is directed to a data transmission system that substantially obviates one or more of the problems due to limitations and disadvantages of the related art.

An object of the present invention is to provide a data transmission apparatus and method that are suitable for minimizing EMI and optimizing power consumption.

Another object of the present invention is to provide a liquid crystal display device that minimizes EMI and optimizes power consumption.

A further object of the present invention is to provide a computer system that minimizes EMI and optimizes power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data transmission apparatus according to an embodiment of the present invention includes a mode controller for receiving a data having a plurality of bits along with a synchronous clock to detect a transition amount of the data every period of the synchronous clock and for generating a mode control signal having a logical value changing in accordance with the detected transition amount; a data transmitter, responsive to the mode control signal, for selectively inverting the data and transmitting the inverted data; and a data receiver, responsive to the mode control signal, for selectively inverting the selectively inverted data from the data transmitter to reconstruct the inverted data into the original data.

In another aspect of the present invention, a data transmission includes the steps of receiving a data having a plurality of bits along with a synchronous clock to detect a transition amount of the data every period of the synchronous clock and generating a mode control signal having a logical value changing in accordance with the detected transition amount; responding to the mode control signal to selectively invert the data and transmitting the inverted data; and responding to the mode control signal to selectively invert the selectively inverted data and to reconstruct the inverted data into the original data.

In another aspect of the present invention, a liquid crystal display device includes a mode controller for receiving video data having a plurality of bits to detect a transition amount between nth video data and (n−1)th video data and for generating a mode control signal having a logical value changing in accordance with the detected transition amount, said n being an integer; a data transmitter, responsive to the mode control signal, for selectively inverting the nth video data and transmitting the inverted video data; and a data receiver, responsive to the mode control signal, for selectively inverting the selectively inverted video data from the data transmitter to reconstruct the inverted video data into the original video data.

In another aspect of the present invention, a computer system includes a mode controller for receiving video data having a plurality of bits from a video card to detect a transition amount between nth video data and (n−1)th video data and for generating a mode control signal having a logical value changing in accordance with the detected transition amount, said n being an integer; a data transmitter, responsive to the mode control signal, for selectively inverting the nth video data and transmitting the inverted video data; and a data receiver, responsive to the mode control signal, for selectively inverting the selectively inverted video data inputted, via a transmission line, from the data transmitter and for reconstructing the inverted video data into the original video data.

In a further aspect of the present invention, a computer includes a mode controller for receiving video data having a plurality of bits from a video card to detect a transition amount between nth video data and (n−1)th video data and for generating a mode control signal having a logical value changing in accordance with the detected transition amount, said n being an integer; a data transmitter, responsive to the mode control signal, for selectively inverting the nth video data and transmitting the inverted video data; and a data receiver, responsive to the mode control signal, for selectively inverting the selectively inverted video data inputted, via a transmission line, from the data transmitter and for reconstructing the inverted video data into the original video data and outputting the reconstructed video data to a data driver.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

It will be apparent to those skilled in the art that various modifications and variation can be made in the data transmission apparatus and method of the present invention without departing from the spirit or scope of the invention. Thus, it is intended that the present invention cover the modifications and variations of this invention provided they come within the scope of the appended claims and their equivalents.

Figure 3:
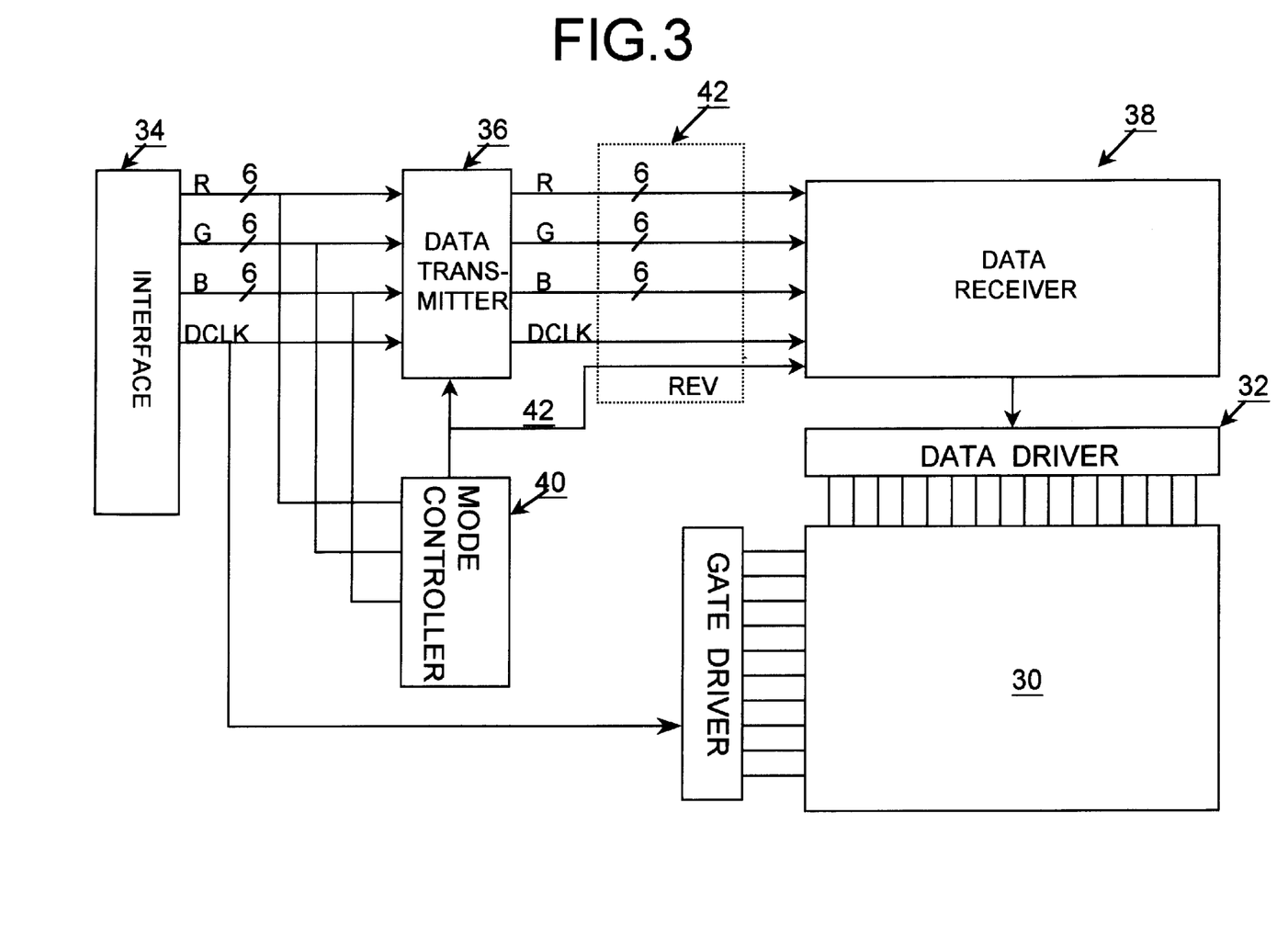
FIG. 3 is a block diagram showing the configuration of a liquid crystal display device employing a data transmission apparatus according to an embodiment of the present invention.

Referring to FIG. 3, there is shown a liquid crystal display device employing a data transmission apparatus according to an embodiment of the present invention. The liquid crystal display device includes a number of D-ICs 32 for divisionally driving source lines of a liquid crystal panel 30, and an interface 34 for supplying video data inputted from a video card (not shown) to the D-ICs 32. The video data to be supplied to the D-ICs 32 includes, for example, red data R0 to R5, green data G0 to G5 and blue data B0 to B5, each of which has 6 bits. The video data is transmitted to the D-ICs 32 according to a data clock DCLK, and converted into an analog signal to be accumulated in a pixel electrode on the corresponding line of a liquid crystal panel which is sequentially scanned by a gate driver.

The liquid crystal display device further includes a data transmitter 36 and a data receiver 38 connected between the interface 34 and the D-ICs 32, and a mode controller 40 for controlling transmission modes of the data transmitter 36 and the data receiver 38. The data receiver 38 may be integrated within the D-IC 32. In this case, the data transmitter 36 and the data receiver 38 is electrically connected by means of an exposed transmission line 42 such as an FPC film. The transmission line 42 includes 18 data bit lines, at least one of clock lines and a single mode control line.

The data transmitter 36 selectively inverts 18 bit video data to be transmitted from the interface 34 to the data receiver 38 in accordance with a logical value of a mode control signal REV from the mode controller 40. More specifically, for example, when a mode control signal REV inputted to the data transmitter 36 has a low logic, the data transmitter 36 transmits the 18 bit video data from the interface 34 to the data receiver 38 as is. On the other hand, when the mode control signal REV has a high logic, the data transmitter 36 inverts the 18 bit video data to be transmitted from the interface 34 to the data receiver 38 and transmits it to the data receiver 38. In a similar manner, the data receiver 38 also selectively inverts 18 bit video data inputted from the data transmitter 36 in accordance with a logical value of the mode control signal REV from the mode controller 40. More specifically, when the mode control signal REV has a low logic, the data receiver 38 transfers the 18 bit video data from the data transmitter 36 to the D-IC 32 as is. On the other hand, when the mode control signal REV has a high logic, the data receiver 38 inverts the 18 bit video data and outputs it to the D-IC 32. By such an operation of the data receiver 38, a low frequency video data from the data transmitter 36 is reconstructed into an original high frequency video data.

The mode controller 40 receives the 18 bit video data Dn from the interface 34 every period of the data clock DCLK to compare data transitions of the received video data with that of video data Dn−1 inputted in the previous data clock period. In other words, the mode controller 40 compares each bit of nth video data Dn with that of (n−1)th video data Dn−1 to detect a data transition state, such as "0→1" or "1→0", and the number of bit transitions.

Further, the mode controller 40 counts the number of transitions and checks if the counted transition number exceeds a critical value (for example, one-half of the total number of bits). In this example, the critical value would be 9 which is one-half of 18 bits. Moreover, the mode controller 40 compares the transition number to the critical value, and inverts a logical value of the mode control signal REV to be applied to the data transmitter 36 and the data receiver 38 each time the transition number exceeds the critical value. In other words, the mode controller 40 detects the data transition number of the present video data and the previous video data every data clock period, and inverts a logical value of the mode control signal each time the transition number exceeds the critical value. By the mode control signal REV generated at the mode controller 40, the data transmitter 36 and the data receiver 38 selectively invert the video data, thereby lowering a frequency of the 18 bit video data transmitted over the FPC film 42.

Figure 4:
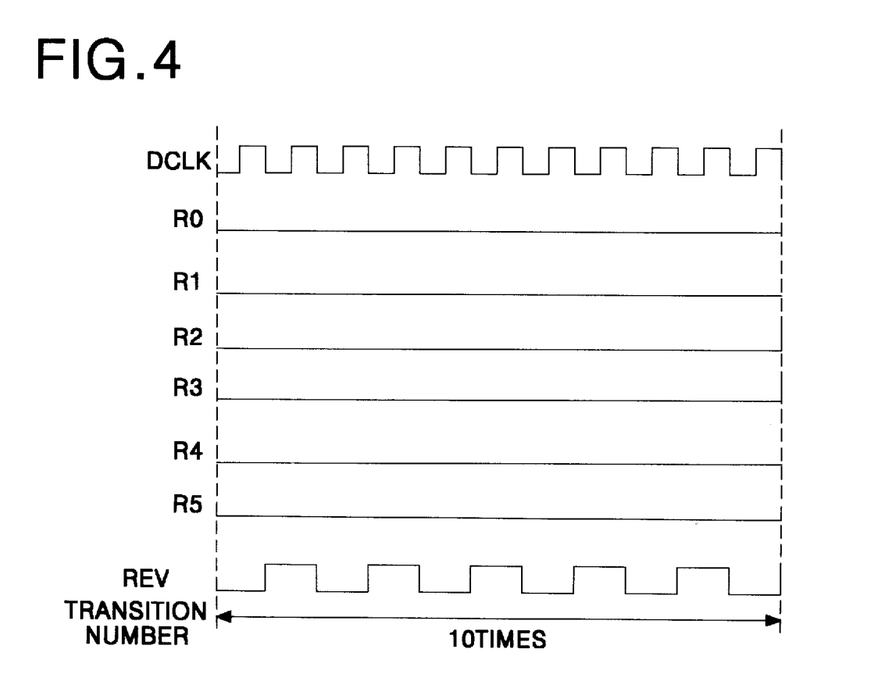
FIG. 4 is a timing diagram of video data transmitted by the data transmission apparatus according to an embodiment of the present invention.

FIG. 4 is a timing diagram of a video data transmitted by a data transmission apparatus according to an embodiment of the present invention, which shows a mode control signal REV and a data inversion state of the video data based on, for example, 6 bit red data in FIG. 2. In FIG. 4, in order to form a vertical stripe within the liquid crystal panel, 6 bit red data "000000" are applied to the liquid crystal display device for each dot clock of T1, T3, T5, T7, T9 and T11 while 6 bit red data "111111" are applied to the liquid crystal display device for each dot clock of T2, T4, T6, T8 and T10. In this case, it is to be noted that 6 data transitions occur at each of T1 and T2, T2 and T3, . . . , and T10 and T11. Accordingly, the mode controller 40 compares a T1 period of 6 bit red data with a T2 period of 6 bit red data to detect the number of data transitions. At this time, since a value of the detected number of transitions is more than a critical value(e.g., "3" with respect to 6 bits) of the data transfer bit number, the mode controller 40 converts the mode control signal REV from a initial state of "low" to "high". Further, in a period T3, the mode controller 40 compares the previous T2 period of 6 bit red data("111111") with the present T3 period of 6 bit red data("000000") to detect 6 data transitions, and then compares it to the critical value "3". In this case, since the detected data transition amount is more than the critical value, the mode controller 40 inverts the mode control signal REV to output "low". Accordingly, since there are 6 continuous data transitions in the red data in the periods T1 to T1, the mode control signal shown in FIG. 4 makes an inversion output 10 times. Furthermore, the data transmitter 36 receives the mode control signal REV from the mode controller 40 to invert the red data, inputted in correspondence with its logical state as shown in FIG. 4 and output the inverted data. It can be seen from FIG. 4 that the 6 bit data is preferably output only at a low state to eliminate cause of EMI dramatically. In other words, only the mode control signal REV changes 10 times without any data transitions in the data lines during the 11 periods of the data clock DCLK. Thus, the video data transmitted by the data transmission apparatus according to the embodiment of the present invention has a frequency of "0 Hz" when a longitudinal stripe is displayed. Accordingly, in a liquid crystal display device having a data transmission apparatus according to the present invention, video data is transmitted under a low frequency, so that the EMI can be restrained or minimized and power consumption at the interface can be reduced.

Figure 5:
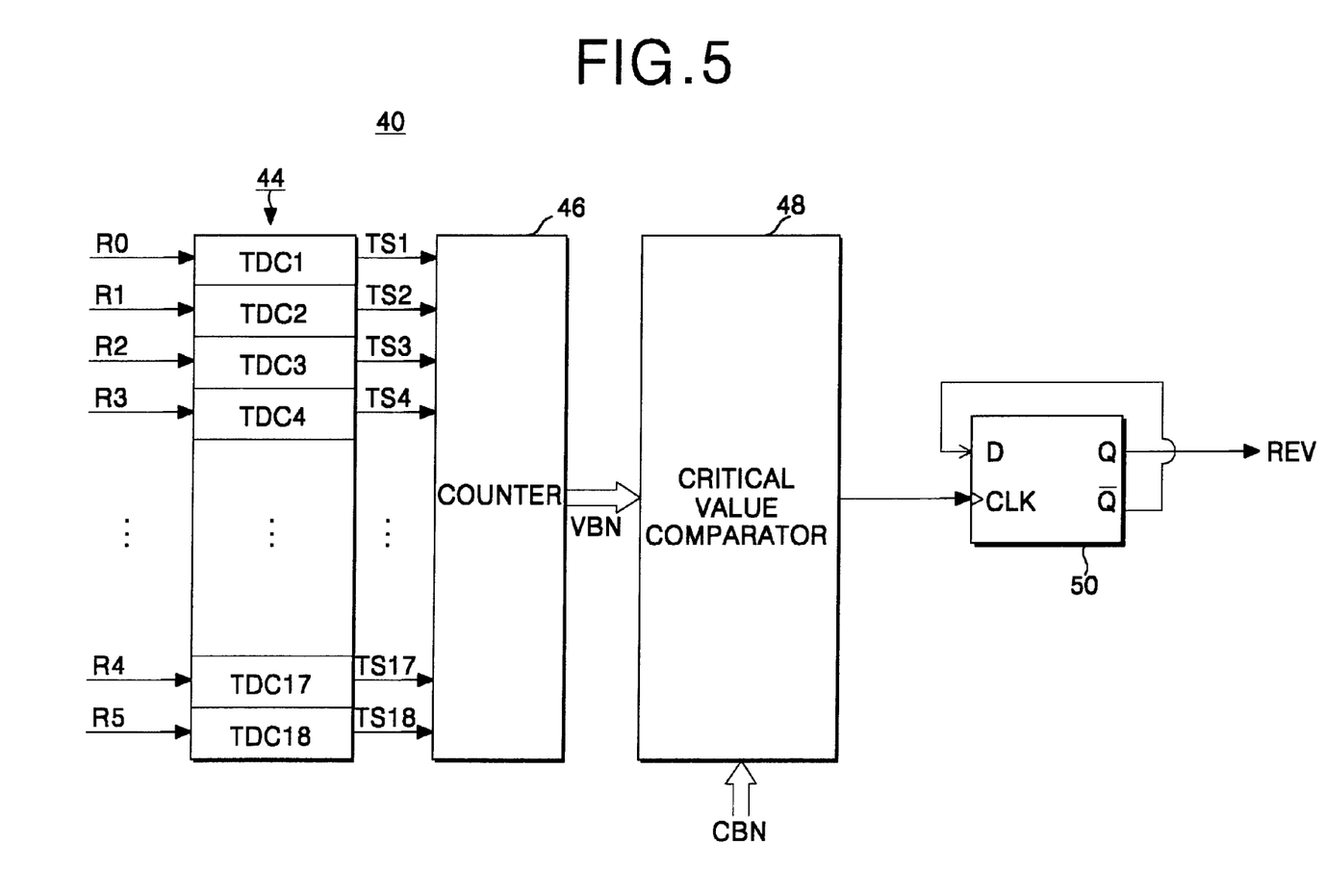
FIG. 5 is a detailed block diagram of the mode controller shown in FIG. 3.

The operation and configuration of the mode controller will be explained with reference to FIGS. 5–10. FIG. 5 shows the mode controller 40 in FIG. 3. The mode controller 40 includes a counter 46, a critical or threshold value comparator 48 and a first flip-flop 50 that are connected, in series, to a transition detecting cell(TDC) array 44. The transition detecting cell array 44 includes 18 transition detecting cells TDC1 to TDC 18 for inputting 18 bit red, green, and blue data (R0 to R5, G0 to G5, and B0 to B5) from the interface 34 in FIG. 3.

Figure 6:
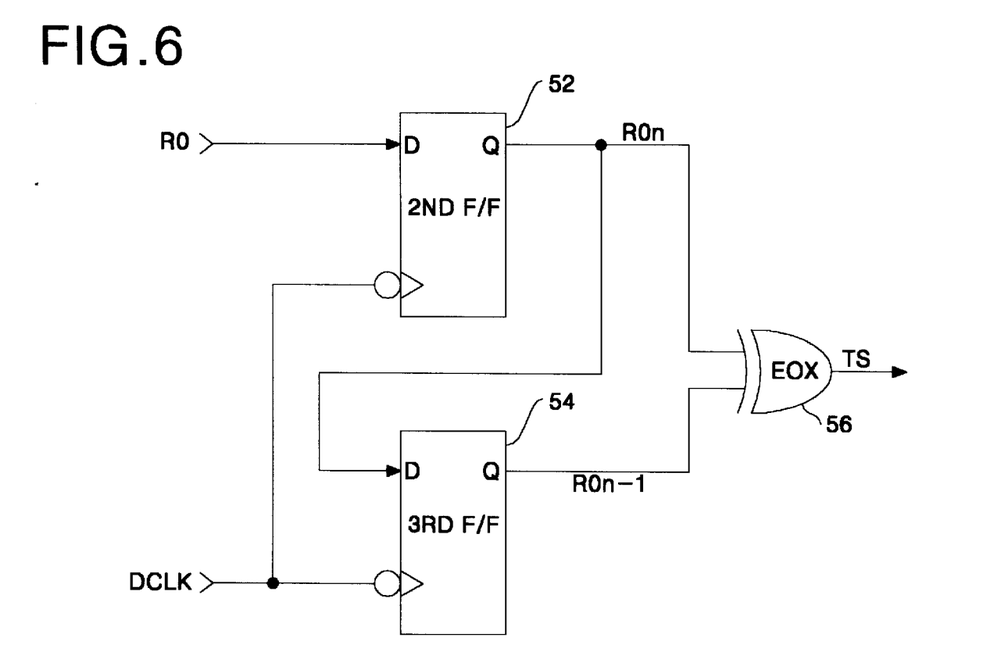
FIG. 6 is a detailed circuit diagram of the transition detecting cell shown in FIG. 5.

FIG. 6 shows one of the transition detecting cells TDC1 to TDC18 in detail. The transition detecting cell TDC includes second and third flip-flops 52 and 54 connected in parallel, and an exclusive OR gate(EOX) 56 for comparing bit data stored in the flip-flops 52 and 54. The second and third flip-flops 52 and 54 are synchronized with a data clock DCLK from the interface 34 to latch the nth data and the (n−1)th data, respectively.

The exclusive OR gate 56 receives the latched data from the second and third flip-flops 52 and 54 to compare the respective data, and generates a transition detection signal TS. In other words, the exclusive OR gate 56 outputs a transition detection signal TS having "0" value indicating no data transition when "0, 0" data or "1,1" data are inputted from the second and third flip-flops 52 and 54, whereas a transition detection signal TS having "1" value is output indicating a data transition of either "0, 1" or "1, 0" from the second and third flip-flops 52 and 54. Each of the 18 transition detecting cells TDC1 to TDC 18 receives 1 bit data and compares it with the 1 bit data in the previous period to detect a transition state of each corresponding bit, and outputs the detection signals TS1 to TS 18 to the counter 46 in FIG. 5. The counter 46 counts the number of transition detection signals TS having a specific logic from the 18 transition detection signals TS1 to TS 18 from the transition detecting cell array 44 and supplies the counted value to the critical value comparator 48 as a transition bit number VBN. In this case, an adder can be used as the counter 46.

The critical value comparator 48 detects whether or not the transition bit number from the counter 46 exceeds a predetermined critical bit number CBN. The critical bit number is preferably set to a number (e.g., 9) corresponding to half of the video data, but may be set to a larger or smaller number. If the transition bit number VBN exceeds the critical bit number CBN, then the critical value comparator 48 applies a comparison signal having a specific logic pulse to the first flip-flop 50. Whenever a comparison signal having a specific logic pulse is inputted from the critical value comparator 48, the first flip-flop 50 inverts a logic state of the mode control signal REV generated at its output terminal Q. The logic state of the mode control signal REV does not change during a time interval when bit data is below the critical value; while it changes from "high" to "low" or vice versa each time bit data is above the critical value for a certain bit number of video data.

An operation of the mode controller 40, a generation process of the mode control signal REV and an inversion process of the transmission and receipt data will be explained in detail with reference to the following Tables.

For example, values of nth to (n+4)th dot data are as described in the following Table 1, and assuming that an initial value of the mode control signal REV is "0", an operation of the mode controller 40 is as follows.

TABLE 1

|  | R[0:5] | G[0:5] | B[0:5] | VBN | REV |
| --- | --- | --- | --- | --- | --- |
| Dn | 000000 | 000000 | 000000 | 0 | Low |
| Dn + 1 | 111111 | 111111 | 111111 | 18 | High |
| Dn + 2 | 000000 | 000000 | 000000 | 18 | Low |
| Dn + 3 | 001101 | 111111 | 001110 | 12 | High |
| Dn + 4 | 001101 | 000000 | 001110 | 6 | High |

With reference to Table 1, the transition detecting cell array 44 compares data latched in Dn+1 period with data in the present period to output transition detecting signals TS1 to TS 18 having a value of "111111111111111111" to the counter 46. The counter 46 collects the transition detecting signals to output a transition bit number VBN of "18", the critical value comparator 48 compares the transition bit number VBN of "18" with the critical bit number CBN to output a mode control signal REV of high logic state by way of the first flip-flop 50. In a similar manner, for the Dn+2 period, the mode controller 40 inverts the mode control signal REV to output a mode control signal REV of low logic state because the transition bit number in the Dn+2 period is "18". For the Dn+3 period, the mode controller 40 inverts the mode control signal REV to output a high logic state because the transition bit number in the Dn+3 period is "2". For the Dn+4 period, the mode controller 40 maintains and outputs the high logic state of the mode control signal from the previous period because the transition bit number VBN in the Dn+4 period is "6", which is less than the critical bit number(i.e., 9).

Figure 7:
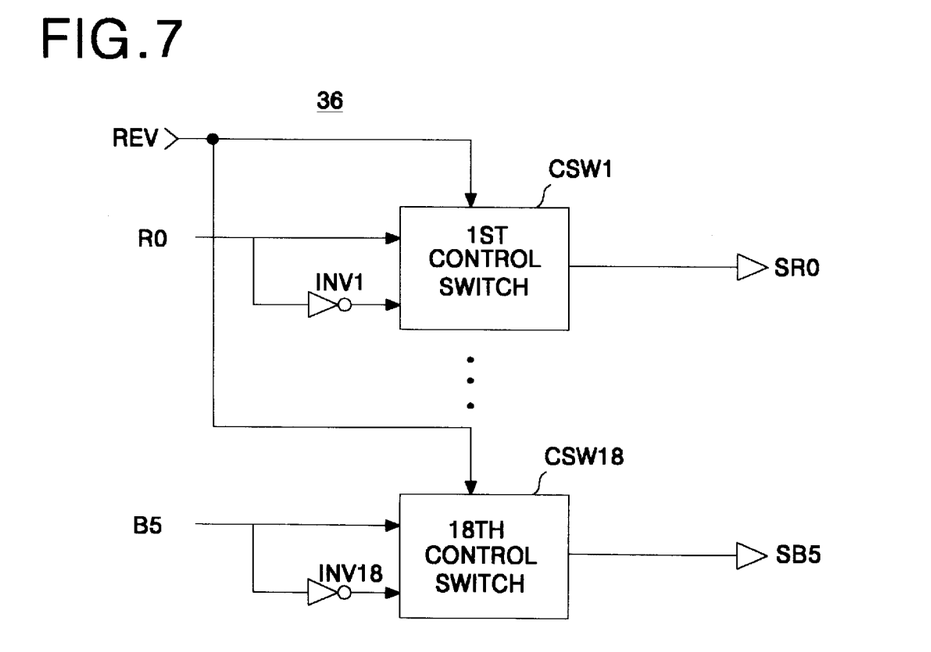
FIG. 7 is a block circuit diagram showing an embodiment of the data transmitter in FIG. 3.

Referring now to FIG. 7, an embodiment of the data transmitter 36 in FIG. 3 is shown in detail. The data transmitter 36 preferably includes control switches CSW1 to CSW18 for directly receiving 18 bit video data from the interface 34 (divisionally by one bit), or inversely receiving them by way of 18 inverters INV1 to INV18. The control switches CWS1 to CWS18 respond commonly to the mode control signal REV from the mode controller 40 (shown in FIG. 3 and FIG. 5) to select and output a bit data in an inverted or non-inverted state. More specifically, each control switch CWS1 to CWS18 delivers a video data from the interface 34 to the data receiver 38 in FIG. 3 as is when the mode control signal REV is at a low logic, for example, whereas it delivers a video data inverted by the inverters INV1 to INV18 to the data receiver 38 when the mode control signal REV is at a high logic. For example, using the data in the above Table 1, the data transmitter 36 converts and outputs data in accordance with a mode control signal as described in Table 2 below.

TABLE 2

|  | SR[0:5] | SG[0:5] | SB[0:5] | REV |
| --- | --- | --- | --- | --- |
| Dn | 000000 | 000000 | 000000 | Low |
| Dn + 1 | 000000 | 000000 | 000000 | High |
| Dn + 2 | 000000 | 000000 | 000000 | Low |
| Dn + 3 | 110010 | 000000 | 110001 | High |
| Dn + 4 | 110010 | 111111 | 110001 | High |

According to the operations of the mode controller 40 and the data transmitter 36, the video data in Table 1 is converted to the video data SR0 to SB5 as described in Table 2 and transmitted, via a second transmission line 42, to the data receiver 38. In this case, there are 54 data transitions in the original data in Table 1 and only 12 data transitions in the converted data in Table 2. Accordingly, EMI as well as power consumption in the liquid crystal display device can be reduced in the present invention.

Figure 8:
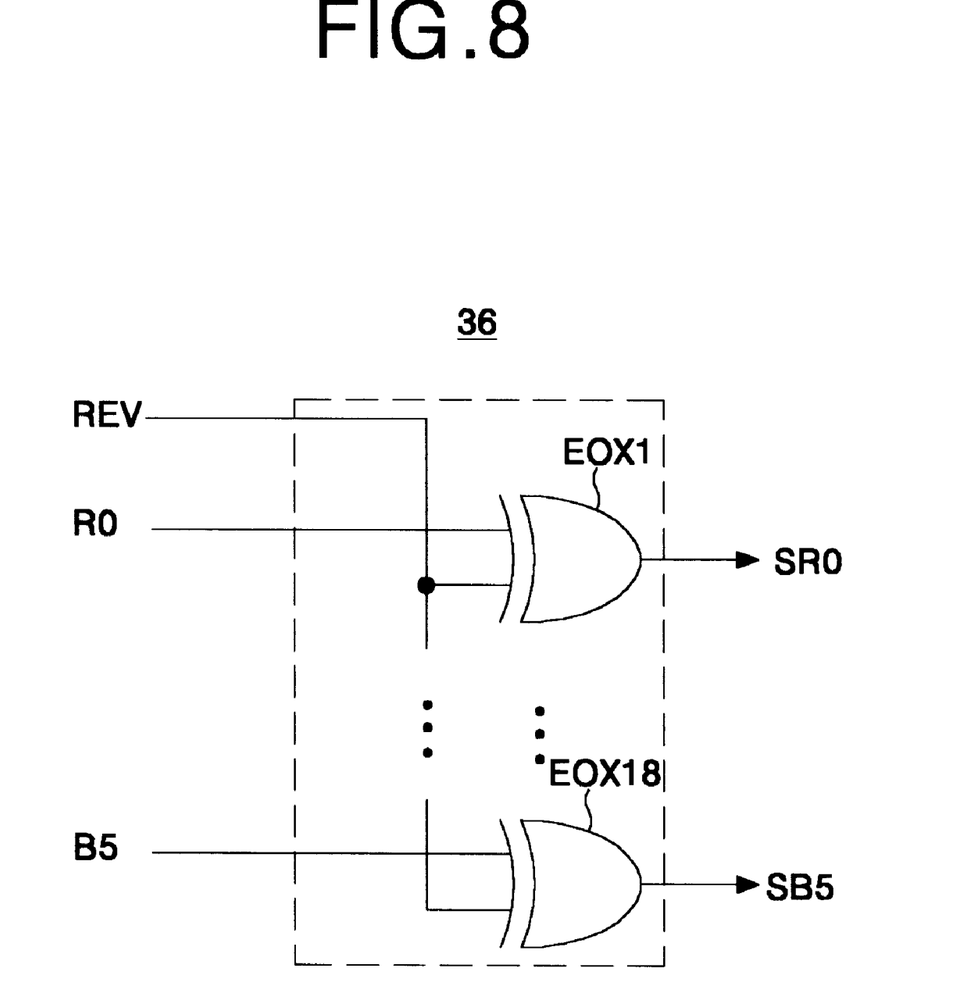
FIG. 8 is a circuit diagram showing another embodiment of the data transmitter in FIG. 3.

FIG. 8 shows another embodiment of the data transmitter 36 in FIG. 3. In FIG. 8, the data transmitter 36 includes 18 exclusive OR gates EOX1 to EOX18 for receiving 18 bit video data from the interface 34 in FIG. 3 (divisionally by one bit). The exclusive OR gates EOX1 to EOX18 respond commonly to the mode control signal REV from the mode controller 40 (shown in FIG. 3 and FIG. 5) to invert the video data selectively. In other words, the video data is output as is when a mode control signal REV of low logic state is input to the exclusive OR gates EOX1 to EOX18; while an inverted video data is output when a mode control signal REV of high logic state is input thereto.

Figure 9:
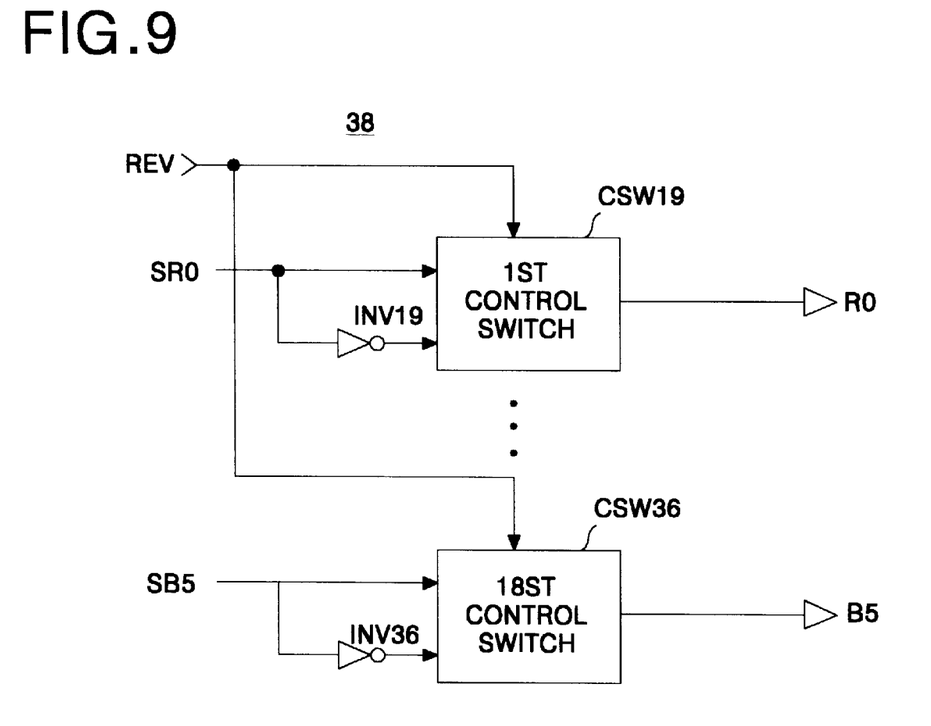
FIG. 9 is a block circuit diagram showing an embodiment of the data receiver in FIG. 3.

Referring now to FIG. 9, there is shown an embodiment of the data receiver 38 in FIG. 3. The data receiver 38 includes 18 inverters INV19 to INV36 for receiving 18 bit video data SR0 to SB5 from the data transmitter in FIG. 3 (divisionally by one bit), and 18control switches CSW19 to CSW36 connected to the inverters INV19 to INV36, respectively. In the data receiver 38, each control switch CSW19 to CSW36 delivers bit data input, via the transmission line 42, from the data transmitter 36 to the D-ICs 32 (in FIG. 3). The bit data is delivered to the D-ICs 32 as is when the mode control signal REV is at a low state; while inverted bit data is delivered from each inverter INV19 to INV36 to the D-ICs 32 when the mode control signal REV is at a high state.

An operation of the data receiver 38 will be explained with reference to Table 2 above and Table 3 below.

TABLE 3

|  | R[0:5] | G[0:5] | B[0:5] | REV |
| --- | --- | --- | --- | --- |
| Dn | 000000 | 000000 | 000000 | Low |
| Dn + 1 | 111111 | 111111 | 111111 | High |
| Dn + 2 | 000000 | 000000 | 000000 | Low |

TABLE 3-continued

|  | R[0:5] | G[0:5] | B[0:5] | REV |
|---|---|---|---|---|
| Dn + 3 | 001101 | 111111 | 001110 | High |
| Dn + 4 | 001101 | 000000 | 001110 | High |

If the data as described in Table 2 and the mode control signal REV are input over the transmission line 42, then the data receiver 38 reconstructs the data into the original data output from the interface 34 as described in Table 3, and outputs the reconstructed data to the D-ICs 32. As described above, the data receiver 38 selectively inverts the 18 bit video data from the data transmitter 36 in response to the mode control signal REV, thereby being reconstructed into the original video data R0 to B5.

Figure 10:
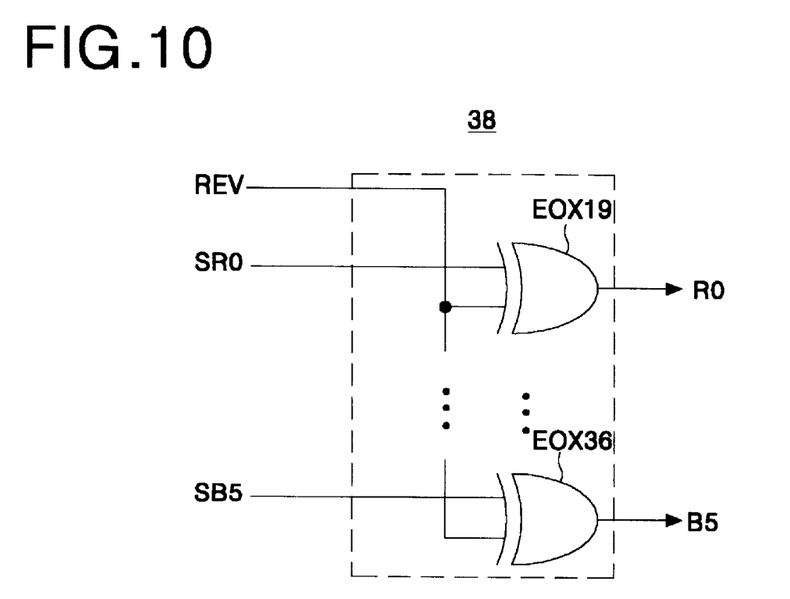
FIG. 10 is a circuit diagram showing an embodiment of the data receiver in FIG. 3.

FIG. 10 shows another embodiment of the data receiver 38 in FIG. 3. In FIG. 10, the data receiver 38 is configured similarly to the data transmitter 36 shown in FIG. 8. Each exclusive OR gate EOX19 to EOX36 responds to the applied mode control signal REV to selectively invert the video data input over the transmission line 42, and transfers the selectively inverted video data to the D-ICs 32. The above-mentioned data receiver 38 may be integrated within the D-ICs 32. An example of the D-ICs having such a configuration is disclosed in the Japanese Patent Laid-open Gazette No. Pyung 3-208090.

The above-mentioned embodiments of the present invention have been explained base on a liquid crystal display device employing a D-IC with a so-called single bank structure. In a liquid crystal display device having a double bank structure, 18 bit even-numbered video data and 18 bit odd-numbered video data are transmitted from the interface 34. For such structure, the embodiment of the present invention can be implemented by transmitting the video data along twice the number of transmission lines and setting the critical bit number is then set to, for example, "18" in addition to the configuration as shown in FIG. 3 to FIG. 10. This is because 36 bits of data are transmitted over the transmission line between the interface and the D-ICs in the liquid crystal display device.

Figure 11:
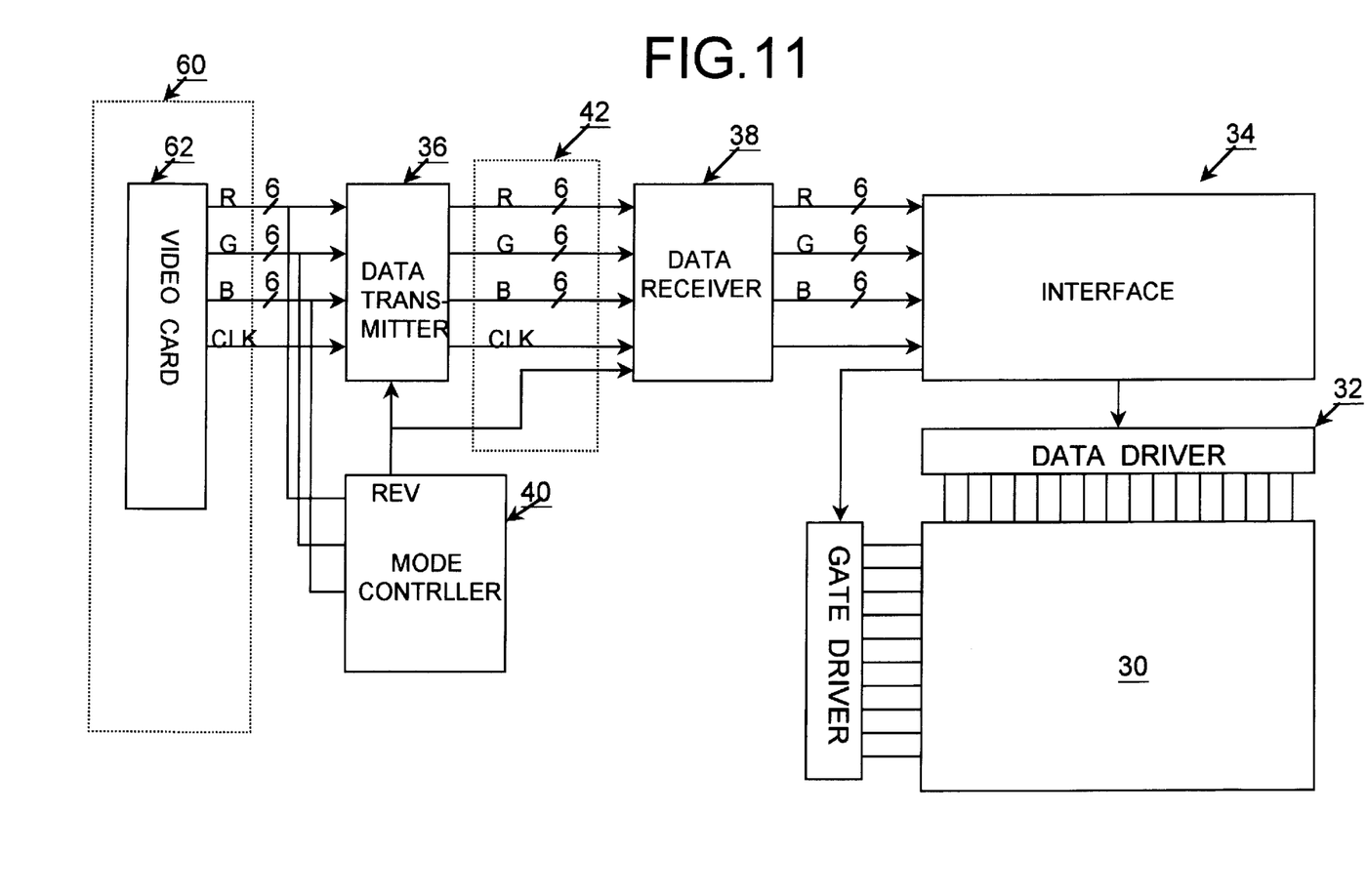
FIG. 11 is a block diagram showing the configuration of a computer system employing a data transmission apparatus according to another embodiment of the present invention.

Referring now to FIG. 11, there is shown a computer system employing a data transmission apparatus according to another embodiment of the present invention. The computer system includes a data transmitter 36 and a data receiver 38 that are connected, in series, between a video card 62 within a computer main body 60 and an interface 34, and a mode controller 40 for controlling transmission modes of the data transmitter 36 and the data receiver 38. The video card 62 generates video data and a clock CLK. The video data includes red data (R0 to R5), green data (G0 to G5) and blue data (B09 to B5), each of which has 6 bit, for example. The data transmitter 36 is electrically connected to the data receiver 38 preferably by means of an FPC film 42. The FPC film 42 includes 18 data bit lines, at least one of data clock line and a single mode line, or both. The data transmitter 36 selectively inverts 18 bit video data to be transmitted from the video card 62 to the data receiver 38 in accordance with a logic value of a mode control signal REV from the mode controller 40. In a similar manner, the data receiver 38 selectively inverts the 18 bit video data R0 to B5 to be transmitted from the data transmitter 36 to the interface 34 in accordance with the logic value of the mode control signal REV from the mode controller 40. Accordingly, an EMI at the video card 62 and the FPC film 42 can be minimized and a power consumption in the video card 62 can be reduced. Finally, the interface 34 supplies the video data reconstructed by the data receiver 38 to, for example, the liquid crystal display device and other suitable devices.

Figure 12:
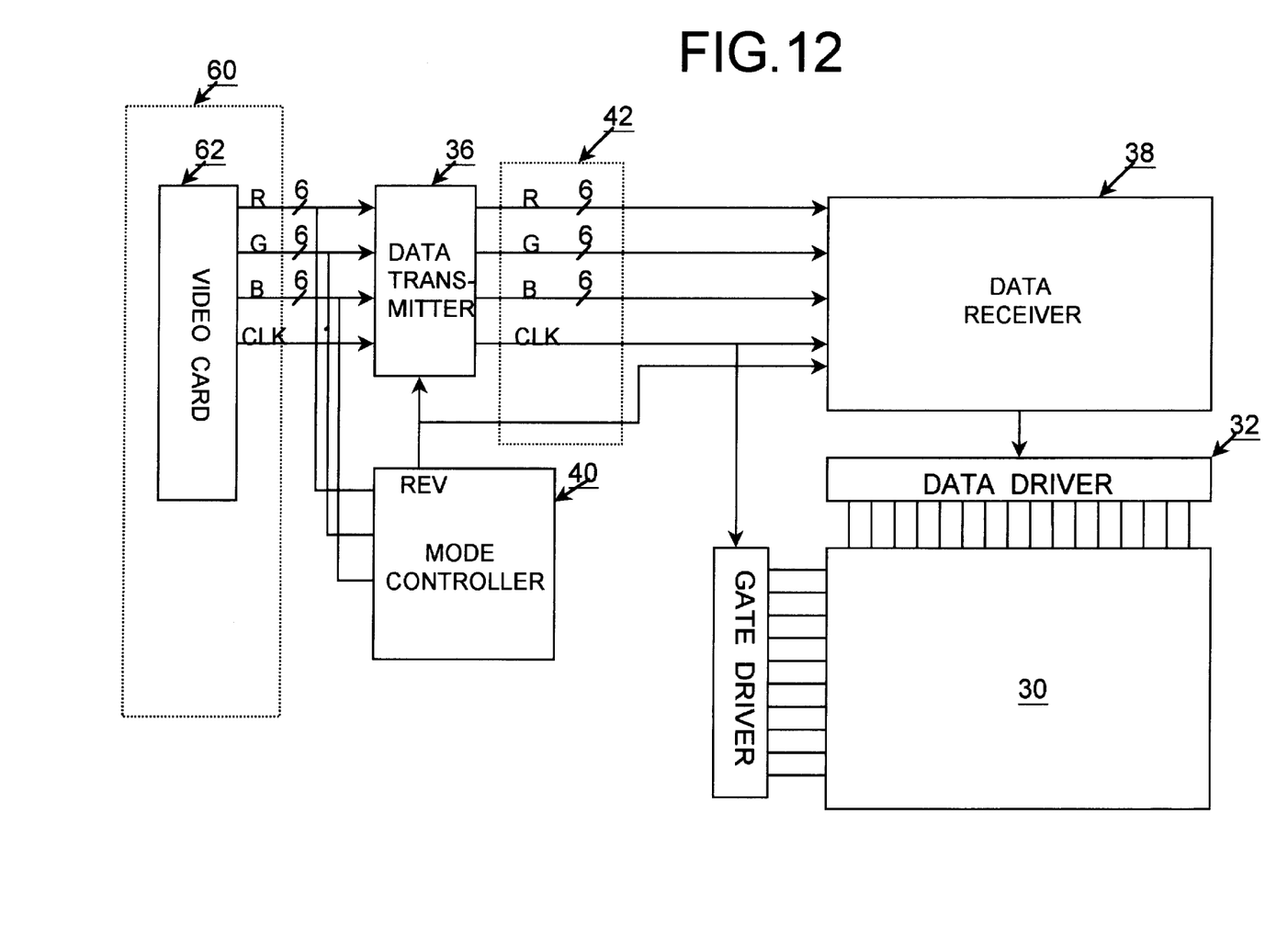
FIG. 12 is a block diagram showing the configuration of a computer system employing a data transmission apparatus according to still another embodiment of the present invention.

Referring to FIG. 12, there is shown a computer system employing a data transmission apparatus according to still another embodiment of the present invention. The computer system includes a data transmitter 36 and a data receiver 38 that are connected, in series, between a video card 62 and D-ICs 32, and a mode controller 40 for controlling transmission modes of the data transmitter 36 and the data receiver 38. The data transmitter 36 is electrically connected to the data receiver 38 preferably by means of an FPC film 42. The FPC film 42 includes 18 data bit lines, at least one of data clock line and a single mode line or both. The data transmitter 36 selectively inverts 18 bit video data to be transmitted from the video card 62 to the data receiver 38 in accordance with a logic value of a mode control signal REV from the mode controller 40.

In response to the mode control signal REV generated at the mode controller 40, the data transmitter 36 and the data receiver 38 selectively invert the video data to lower a frequency (or the number of transitions in the logic state) of the video data transmitted over the FPC film 42. Accordingly, EMI at the video card 62 and the FPC film 42 can be restrained or minimized and power consumption in the video card 62 can be reduced.

As described above, in the data transmission apparatus and method according to the present invention, a data stream transmitted over a number of bit lines is inverted or not inverted according to the number of bit transitions in the data stream. For example, the bits of the data stream is inverted if the number of bit transitions exceeds a critical value, thereby lowering the number of transitions, that is, the frequency of the data stream. As a result, the data transmission apparatus and method of the present invention is capable of restraining or minimizing EMI at the transmission line as well as reducing power consumption at the data transmission side. Furthermore, in the liquid crystal display device, the computer interface device, and the computer system to which the data transmission according to the present invention is applied, EMI and power consumption at the video card and/or the interface can be reduced.

It will be apparent to those skilled in the art that various modifications and variation can be made in the data transmission apparatus and method of the present invention without departing from the spirit or scope of the invention. Thus, it is intended that the present invention cover the modifications and variations of this invention provided they come within the scope of the appended claims and their equivalents.

What is claimed is:

1. A data transmission system comprising:
   a mode controller receiving first data having a plurality of bits and outputting a first control signal in accordance with a number of data transitions of the plurality of bits of the data;
   a data transmitter coupled to the mode controller and outputting second data corresponding to the first data in response to the first control signal from the mode controller; and
   a data receiver coupled to the data transmitter and outputting third data corresponding to the second data in response to a second control signal corresponding to the first control signal.

2. The data transmission system according to claim 1, wherein the first and second control signals are the same signal.

3. The data transmission system according to claim 1, wherein the second data is an inverse of the first data depending on the first control signal.

4. The data transmission system according to claim 1, wherein the third data is an inverse of the second data depending on the second control signal.

5. The data transmission system according to claim 1, wherein the third data is the same as the first data.

6. The data transmission system according to claim 1, wherein the mode controller comprises:
   transition detecting unit receiving the first data and detecting a transition in the plurality of bits of the first data;
   a counter coupled to the transition detecting unit counting the number of transitions in the plurality of bits of the first data;
   a comparator coupled to the counter comparing the number of transitions to a reference value; and
   an output unit coupled to the comparator and outputting the first control signal.

7. The data transmission system according to claim 6, wherein the reference value is one of N/2, (N/2−1), and (N/2+1), where N is the number of bits of the first data.

8. The data transmission system according to claim 6, wherein the transition detecting unit comprises a plurality of transition detecting cells corresponding to the plurality of bits of the first data.

9. The data transmission system according to claim 8, wherein each of the transition detecting cell includes:
   first flip-flop having a first output;
   second flip-flop having a second output, the second flip-flop receiving the first output of the first flip-flop; and
   a logic unit receiving the first and second outputs from the first and second flip-flops and outputting a third output, the third output containing information on a data transition of a corresponding bit of the plurality of the data bits of the first data.

10. The data transmission system according to claim 1, wherein the data transmitter comprises a control unit receiving the first data, an inverse of the first data, and the first control signal and outputting the second data, the second data being one of the inverse of the first data or the first data.

11. The data transmission system according to claim 1, wherein the data transmitter includes a logic unit receiving the first data and the first control signal and outputting the second data, the second data being one of the inverse of the first data or the first data.

12. The data transmission system according to claim 11, wherein the logic unit includes a plurality of exclusive OR gates.

13. The data transmission system according to claim 1, wherein the data receiver comprises a control unit receiving the second data, an inverse of the second data, and the second control signal and outputting the third data, the third data being one of the inverse of the second data or the second data.

14. The data transmission system according to claim 1, wherein the data receiver includes a logic unit receiving the second data and the second control signal and outputting the third data, the third data being one of the inverse of the second data or the second data.

15. The data transmission system according to claim 14, wherein the logic unit includes a plurality of exclusive OR gates.

16. A data transmission system for a computer comprising:
   a main control unit including:
      a video card outputting first data;
      a mode controller receiving first data having a plurality of bits and outputting a first control signal in accordance with a number of data transitions of the plurality of bits of the data; and
      a data transmitter coupled to the mode controller and outputting second data corresponding to the first data in response to the first control signal from the mode controller; and
   a display unit coupled to the main control unit including:
      a data receiver coupled to the data transmitter and outputting third data corresponding to the second data in response to a second control signal corresponding to the first control signal; and
      data driver coupled to the data receiver and receiving the third data.

17. A data transmission system for a computer according to claim 16, further comprising an interface unit between the data receiver and the data driver.

18. A data transmission system for a computer according to claim 16, wherein the data receiver and the data driver are in one unit.

19. A liquid crystal display device having a data transmission system comprising:
   a mode controller receiving first data having a plurality of bits and outputting a first control signal in accordance with a number of data transitions of the plurality of bits of the data;
   a data transmitter coupled to the mode controller and outputting second data corresponding to the first data in response to the first control signal from the mode controller; and
   a data receiver coupled to the data transmitter and outputting third data corresponding to the second data in response to a second control signal corresponding to the first control signal.

20. The liquid crystal display device according to claim 19, wherein the first and second control signals are the same signal.

21. The liquid crystal display device according to claim 19, wherein the second data is an inverse of the first data depending on the first control signal.

22. The liquid crystal display device according to claim 19, wherein the third data is an inverse of the second data depending on the second control signal.

23. The liquid crystal display device according to claim 19, wherein the third data is the same as the first data.

24. The liquid crystal display device according to claim 19, wherein the mode controller comprises:
   transition detecting unit receiving the first data and detecting a transition in the plurality of bits of the first data;
   a counter coupled to the transition detecting unit counting the number of transitions in the plurality of bits of the first data;
   a comparator coupled to the counter comparing the number of transitions to a reference value; and
   an output unit coupled to the comparator and outputting the first control signal.

25. The liquid crystal display device according to claim 24, wherein the reference value is one of N/2, (N/2−1), and (N/2+1), where N is the number of bits of the first data.

26. The liquid crystal display device according to claim 24, wherein the transition detecting unit comprises a plurality of transition detecting cells corresponding to the plurality of bits of the first data.

27. The liquid crystal display device according to claim 26, wherein each of the transition detecting cell includes:
   first flip-flop having a first output;

second flip-flop having a second output, the second flip-flop receiving the first output of the first flip-flop; and a logic unit receiving the first and second outputs from the first and second flip-flops and outputting a third output, the third output containing information on a data transition of a corresponding bit of the plurality of the data bits of the first data.

28. The liquid crystal display device according to claim 19, wherein the data transmitter comprises a control unit receiving the first data, an inverse of the first data, and the first control signal and outputting the second data, the second data being one of the inverse of the first data or the first data.

29. The liquid crystal display device according to claim 19, wherein the data transmitter includes a logic unit receiving the first data and the first control signal and outputting the second data, the second data being one of the inverse of the first data or the first data.

30. The liquid crystal display device according to claim 29, wherein the logic unit includes a plurality of exclusive OR gates.

31. The liquid crystal display device according to claim 19, wherein the data receiver comprises a control unit receiving the second data, an inverse of the second data, and the second control signal and outputting the third data, the third data being one of the inverse of the second data or the second data.

32. The liquid crystal display device according to claim 19, wherein the data receiver includes a logic unit receiving the second data and the second control signal and outputting the third data, the third data being one of the inverse of the second data or the second data.

33. The liquid crystal display device according to claim 32, wherein the logic unit includes a plurality of exclusive OR gates.

34. A computer comprising:
a main control unit including:
a video card outputting first data;
a mode controller receiving first data having a plurality of bits and outputting a first control signal in accordance with a number of data transitions of the plurality of bits of the data; and
a data transmitter coupled to the mode controller and outputting second data corresponding to the first data in response to the first control signal from the mode controller; and
a display unit coupled to the main control unit including:
a data receiver coupled to the data transmitter and outputting third data corresponding to the second data in response to a second control signal corresponding to the first control signal; and
data driver coupled to the data receiver and receiving the third data.

35. A computer according to claim 34, further comprising an interface unit between the data receiver and the data driver.

36. A computer according to claim 34, wherein the data receiver and the data driver are in one unit.

37. A method of transmitting data comprising the steps of:
receiving first data having a plurality of bits and
outputting a first control signal in accordance with a number of data transitions of the plurality of bits of the data;
outputting second data corresponding to the first data in response to the first control signal; and outputting third data corresponding to the second data in response to a second control signal corresponding to the first control signal.

38. A data transmission apparatus, comprising:
a mode controller for receiving a first data having a plurality of bits and a clock signal to detect a number of transitions of the first data corresponding to the clock signal and for generating a mode control signal having a logic value changing in accordance with the number of transitions;
a data transmitter, responsive to the mode control signal, for selectively inverting the first data and transmitting the inverted data; and
a data receiver, responsive to the mode control signal, for selectively inverting the selectively inverted data from the data transmitter to reconstruct the selectively inverted data into the first data.

39. A data transmission method comprising the steps of:
receiving a first data having a plurality of bits and a clock signal to detect a number of transitions in the first data corresponding to the clock signal and generating a mode control signal having a logic value changing in accordance with the number of transitions;
selectively inverting the first data in response to the mode control signal and transmitting the inverted data; and
selectively inverting the selectively inverted data in response to the mode control signal and reconstructing the inverted data into the first data.

40. A liquid crystal display device having a data driver for driving a liquid crystal panel, comprising:
a mode controller for receiving video data having a plurality of bits to detect a number of transitions between a first video data and a second video data and for generating a mode control signal having a logic value changing in accordance with the number of transitions;
a data transmitter, responsive to the mode control signal, for selectively inverting the second video data and transmitting the selectively inverted video data; and
a data receiver, responsive to the mode control signal, for selectively inverting the selectively inverted video data from the data transmitter to reconstruct the inverted video data into the second video data.

41. A computer system including a liquid crystal display device and a video card for producing video data to be supplied to the liquid crystal display device, said system comprising:
a mode controller for receiving video data having a plurality of bits from the video card to detect a number of bit transitions between a first video data and a second video data and for generating a mode control signal having a logic value changing in accordance with the number of bit transitions;
a data transmitter, responsive to the mode control signal, for selectively inverting the second video data and transmitting the selectively inverted video data; and
a data receiver, responsive to the mode control signal, for selectively inverting the selectively inverted video data inputted, via a transmission line, from the data transmitter and for reconstructing the inverted video data into the second video data.

* * * * *